(12) United States Patent
Pendharkar et al.

(10) Patent No.: US 10,114,754 B1
(45) Date of Patent: Oct. 30, 2018

(54) TECHNIQUES FOR SPACE RESERVATION IN A STORAGE ENVIRONMENT

(71) Applicant: Veritas Technologies LLC, Mountain View, CA (US)

(72) Inventors: Niranjan Sanjiv Pendharkar, Pune (IN); Anindya Banerjee, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 83 days.

(21) Appl. No.: 14/871,642

(22) Filed: Sep. 30, 2015

(51) Int. Cl.
*G06F 12/08* (2016.01)
*G06F 12/0891* (2016.01)
*G06F 3/06* (2006.01)

(52) U.S. Cl.
CPC .......... *G06F 12/0891* (2013.01); *G06F 3/064* (2013.01); *G06F 3/067* (2013.01); *G06F 3/0608* (2013.01); *G06F 3/0652* (2013.01); *G06F 2212/1044* (2013.01); *G06F 2212/604* (2013.01)

(58) Field of Classification Search
None
See application file for complete search history.

(56) References Cited

U.S. PATENT DOCUMENTS

| 6,412,045 | B1* | 6/2002 | DeKoning | G06F 12/0804 711/133 |
| 9,176,677 | B1* | 11/2015 | Fradkin | G06F 3/00 |
| 2012/0151148 | A1* | 6/2012 | Beardsley | G06F 12/0804 711/129 |
| 2015/0370715 | A1* | 12/2015 | Samanta | G06F 11/00 711/113 |
| 2016/0048532 | A1* | 2/2016 | Islam | G06F 17/30132 707/613 |

* cited by examiner

*Primary Examiner* — Tracy C. Chan
(74) *Attorney, Agent, or Firm* — Patent Law Works LLP (57) ABSTRACT

Improved techniques and systems are disclosed for ensuring that physical storage is available for cached allocating writes in a thinly provisioned storage environment. By monitoring the size of the cached allocating writes in the file system cache and taking cache occupancy reduction actions when criteria for cache reduction are fulfilled, caching of allocating writes that do not have a corresponding physical storage allocation can be eliminated or reduced to a user-configurable maximum without disabling caching of allocating writes. Using these techniques, allocating writes may be cached without risk of data loss.

20 Claims, 9 Drawing Sheets

TECHNIQUES FOR SPACE RESERVATION IN A STORAGE ENVIRONMENT

FIELD OF THE DISCLOSURE

The present disclosure is generally related to digital computer systems, and, more particularly, to techniques for space reservation in a storage environment.

BACKGROUND OF THE DISCLOSURE

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA clusters or failover clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as failover. As part of this process, clustering software may configure the node before starting the application on the node. For example, appropriate file systems may need to be imported and mounted, network hardware may have to be configured, and some supporting applications may need to be running as well.

Many distributed computer systems utilize a centralized shared storage system for their provisioning. Thin provisioning is a mechanism that applies to large-scale centralized computer disk storage systems, SANs, and storage virtualization systems. Thin provisioning allows space to be easily allocated to servers, on a just-enough and just-in-time basis.

Thin Provisioning, in distributed computing systems using a shared storage environment, is a method for optimizing utilization of available storage. It relies on on-demand allocation of blocks of data versus the traditional method of allocating all the blocks up front. This methodology eliminates almost all whitespace, which helps avoid the poor utilization rates, often as low as 10%, that occur in the traditional storage allocation method where large pools of storage capacity are allocated to individual servers but remain unused (not written to). This traditional method is often called "fat" or "thick" provisioning.

With thin provisioning, storage capacity utilization efficiency can be automatically driven up towards 100% with very little administrative overhead. Organizations can purchase less storage capacity up front, defer storage capacity upgrades in line with actual business usage, and save the operating costs (electricity and floor space) associated with keeping unused disk capacity spinning.

Previous systems generally required large amounts of storage to be physically pre-allocated because of the complexity and impact of growing volume (LUN) space. Thin provisioning enables over-allocation or over-subscription.

A volume manager is often used to manage large-scale centralized computer storage systems. However, problems exist where, in such systems, the thinly provisioned arrays change in size and grow. A thinly provisioned array can fail write requests to space that has not yet been allocated to physical storage if it runs out of unallocated physical storage while the allocating write request is cached by the file system. If this allocation failure affected a data write, data may be corrupted or lost. If this allocation failure affected a metadata write of the file system, the file system may get marked for a file system check. Depending upon the size of the file system, a full file system check can take hours and also result in data corruption or data loss.

SUMMARY OF THE DISCLOSURE

The present disclosure provides a solution to the problem of failed writes in thin provisioned systems when allocating writes are cached.

In one embodiment, a method includes caching allocating writes to be stored to physical storage, reserving a block of the physical storage, comparing the total cumulative size of the cached allocating writes to an upper threshold, and, when the total cumulative size of the cached allocating writes exceeds the upper threshold, taking a cache occupancy reduction action.

In some embodiments, the cache occupancy reduction action is performing background flushing to physical storage of the cached allocated writes. In some embodiments, the cache occupancy reduction action is reserving additional physical storage. In some embodiments, these actions may both be taken.

In some embodiments, the method further includes continuing to cache allocating writes, comparing an unbacked data amount to an unbacked data threshold, and, when the unbacked data amount exceeds the unbacked data threshold, taking one or more additional cache occupancy reduction actions. In some embodiments, the unbacked data amount is the total size of the reserved physical storage subtracted from the total cumulative size of the cached allocating writes. In some embodiments, caching of allocating writes is paused when the unbacked data amount exceeds the unbacked data threshold. In some embodiments, the unbacked data threshold is a percentage of the size of the reserved physical storage. In other embodiments, the unbacked data threshold is an amount of data (e.g., an amount in megabytes.) In some embodiments, the unbacked data threshold is user-configurable.

In some embodiments of the method, reserving a block of physical storage includes making an API call to a reserved space management agent.

In some embodiments of the method, the upper threshold is a percentage of the size of the reserved physical storage. In other embodiments of the method, the upper threshold is an amount of data (e.g., an amount in megabytes). In some embodiments, the upper threshold is user-configurable.

In some embodiments, the method further includes pausing caching allocating writes until the cache occupancy reduction action is completed.

In some embodiments, the cache occupancy reduction action includes performing background flushing to physical storage of the cached allocating writes, and the cached allocating writes are written to physical storage other than the reserved physical storage.

In some embodiments, the cache occupancy reduction action includes performing background flushing to physical storage of the cached allocating writes, and, when taking the cache occupancy reduction action has started, further includes comparing the total cumulative size of the cached allocating writes to a lower threshold and stopping the background flushing to physical storage of the cached allocating writes if the total cumulative size of the cached allocating writes is smaller than the lower threshold. In some embodiments, the lower threshold is a percentage of the size of the reserved physical storage. In other embodiments, the lower threshold is an amount of data (e.g., an amount in megabytes). In some embodiments, the lower threshold is user-configurable.

In one embodiment, a system includes a program memory and at least one processor communicatively coupled to the program memory and to a storage device. In this embodiment, the at least one processor is configured to execute program instructions to cause the at least one processor to cache allocating writes to be stored to physical storage in the storage device, to reserve a block of physical storage in the storage device, to compare the total cumulative size of the cached allocating writes to an upper threshold and, when the total cumulative size of the cached allocating writes exceeds the upper threshold, to take a cache occupancy reduction action.

In some embodiments, the cache occupancy reduction action is performing background flushing to physical storage of the cached allocated writes. In some embodiments, the cache occupancy reduction action is reserving additional physical storage. In some embodiments, these actions may both be taken.

In some embodiments, the program instructions further caused the processor to continue to cache allocating writes, to compare an unbacked data amount to an unbacked data threshold, and, when the unbacked data amount exceeds the unbacked data threshold, to take one or more additional cache occupancy reduction actions. In some embodiments, the unbacked data amount is the total size of the reserved physical storage subtracted from the total cumulative size of the cached allocating writes. In some embodiments, caching of allocating writes is paused when the unbacked data amount exceeds the unbacked data threshold. In some embodiments, the unbacked data threshold is a percentage of the size of the reserved physical storage. In other embodiments, the unbacked data threshold is an amount of data (e.g., an amount in megabytes.) In some embodiments, the unbacked data threshold is user-configurable.

In some embodiments, the cache occupancy reduction action includes performing background flushing to physical storage of the cached allocating writes. In some of these embodiments, the program instructions further cause the processor to, when the cache occupancy reduction action has started, compare the total cumulative size of the cached allocating writes to a lower threshold and to stop the background flushing to physical storage of the cached allocating writes if the total cumulative size of the cached allocating writes is smaller than the lower threshold. In some embodiments, the lower threshold is a percentage of the size of the reserved physical storage. In other embodiments, the lower threshold is an amount of data (e.g., an amount in megabytes). In some embodiments, the lower threshold is user-configurable.

In some embodiments, the allocating writes are cached in a cache memory coupled to the at least one processor.

In some embodiments, the system further includes a file system executed by the at least one processor and configured to issue allocating writes.

In some embodiments, the program instructions further configure the at least one processor to reserve the block of storage in the storage device by issuing a storage reservation API command to a reserve space management agent in the storage device.

In some embodiments, the program instructions further configure the at least one processor to execute a cache management agent. In some of these embodiments, the comparison of the total cumulative size of the cached allocating writes to an upper threshold is performed by the cache management agent. In some embodiments, the program instructions further cause the at least one processor to take the cache occupancy reduction action by causing the cache management agent to trigger a cache occupancy reduction agent to perform the cache occupancy reduction action.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Although the present disclosure has been described in connection with one embodiment, the present disclosure is not intended to be limited to the specific forms set forth herein. On the contrary, it is intended to cover such alternatives, modifications, and equivalents as can be reasonably included within the scope of the present disclosure as defined by the appended claims.

In the following detailed description, numerous specific details such as specific method orders, structures, elements, and connections have been set forth. It is to be understood however that these and other specific details need not be utilized to practice embodiments of the present disclosure. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present disclosure. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1:
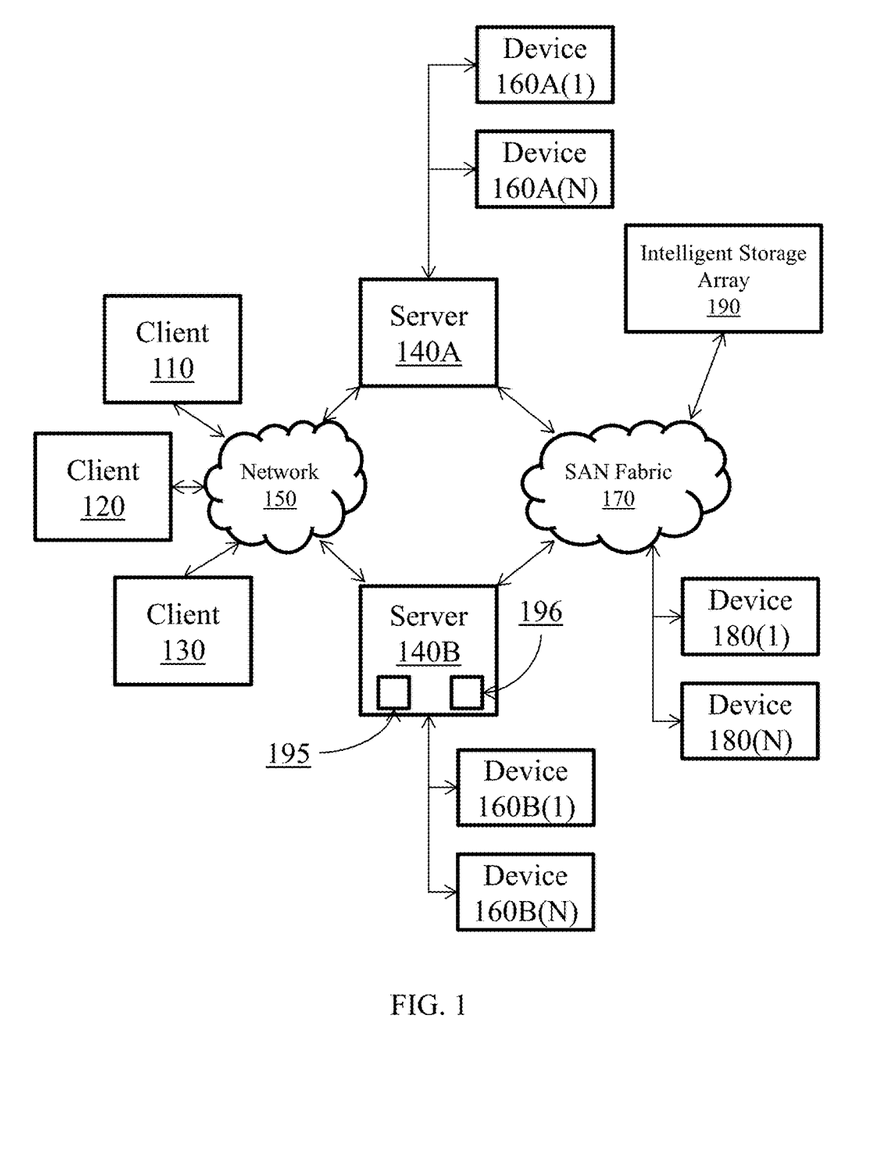
FIG. 1 shows a diagram depicting a network architecture of a client server based computing system in accordance with one embodiment of the present disclosure.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present disclosure. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present disclosure are implemented via a reserved space management agent 195 and cache management agent 196, which are shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present disclosure can function with highly scalable distributed computer systems having hundreds of nodes, or more (e.g., cloud computing system, etc.). It should also be noted that while reserved space management agent 195 and cache management agent 196 are shown as implemented on the same data server, they may be implemented on different data servers.

Figure 2:
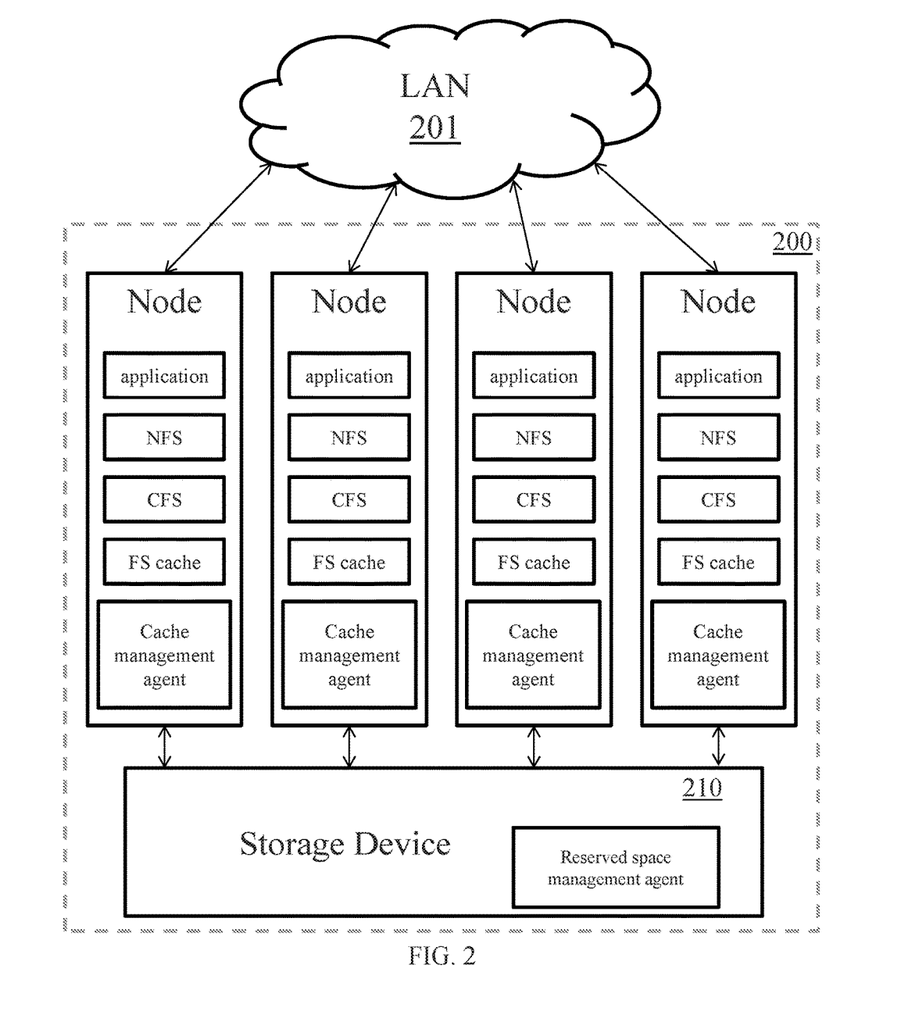
FIG. 2 shows a diagram depicting an exemplary high availability cluster-based computing system in accordance with one embodiment of the present disclosure.

FIG. 2 shows a diagram depicting an exemplary high availability cluster-based computing system 200 in accordance with one embodiment of the present disclosure. As illustrated in FIG. 2, 4 nodes are shown coupled to a common storage device 210. In one embodiment, the nodes on each host are an instantiation comprising an application, a network file system (NFS) and a cluster file system (CFS). Hence, the computer system 200 comprises a four node cluster. Each of the constituent nodes is shown connected to the storage device 210. The nodes of the cluster communicate with one another via the local area network 201. These local area networks can in turn be connected to one or more wide area networks (e.g., the Internet). Although the embodiment is described in the context of a cluster, it should be appreciated that embodiments of the present disclosure can readily scale and function in distributed computer systems and/or cloud based computer systems having hundreds or thousands of nodes.

FIG. 2 shows the manner in which the common storage device can support the mounting and dismounting of the various file systems to which it provides data storage services. The storage device 210 is typically equipped to provide high availability and redundancy while maintaining flexibility of the storage services provided to the various file systems. In the FIG. 2 embodiment, by way of example, the storage device 210 includes a reserved space management agent that functions by allocating data blocks to a reserved space. The constituent nodes of the cluster include a cache management agent that communicates with the file systems and the reserved space management agent to reserve space as needed and manages the amount of cached allocated writes, as well as a file system cache interfaced with the cache management agent. The constituent nodes of the cluster may include further agents implementing functionality of the present disclosure, such as a cache occupancy reduction agent.

Figure 3:
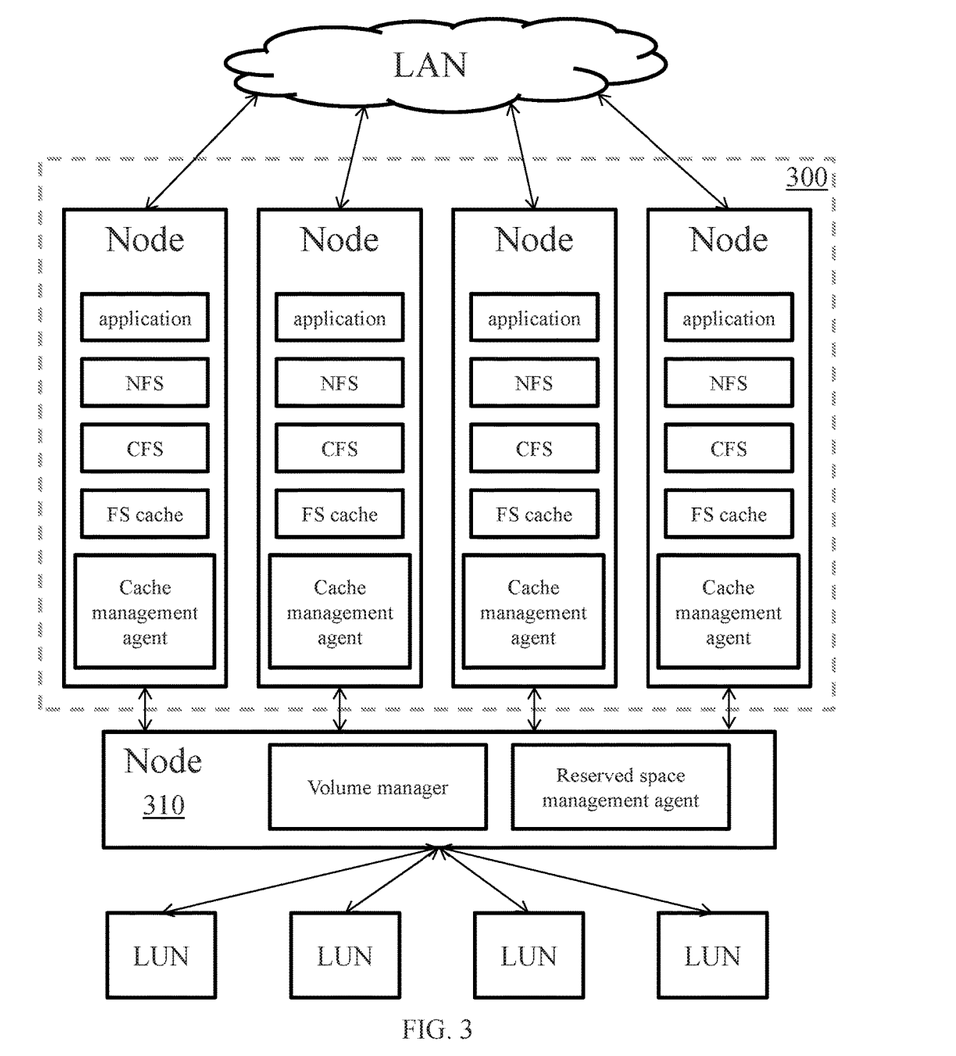
FIG. 3 shows a first exemplary implementation of a storage system in accordance with one embodiment of the present disclosure.

FIG. 3 shows a first exemplary implementation of a storage system in accordance with one embodiment of the present disclosure. As depicted in FIG. 3, the 4 nodes of the cluster 300 are coupled to node 310 which hosts a volume manager and the reserved space management agent. The volume manager functions with a plurality of coupled LUNs (e.g., disk drives, solid-state drives, or the like) to provide volumes (e.g., data storage) which can be used to mount the plurality of network file systems and cluster file systems.

Figure 4:
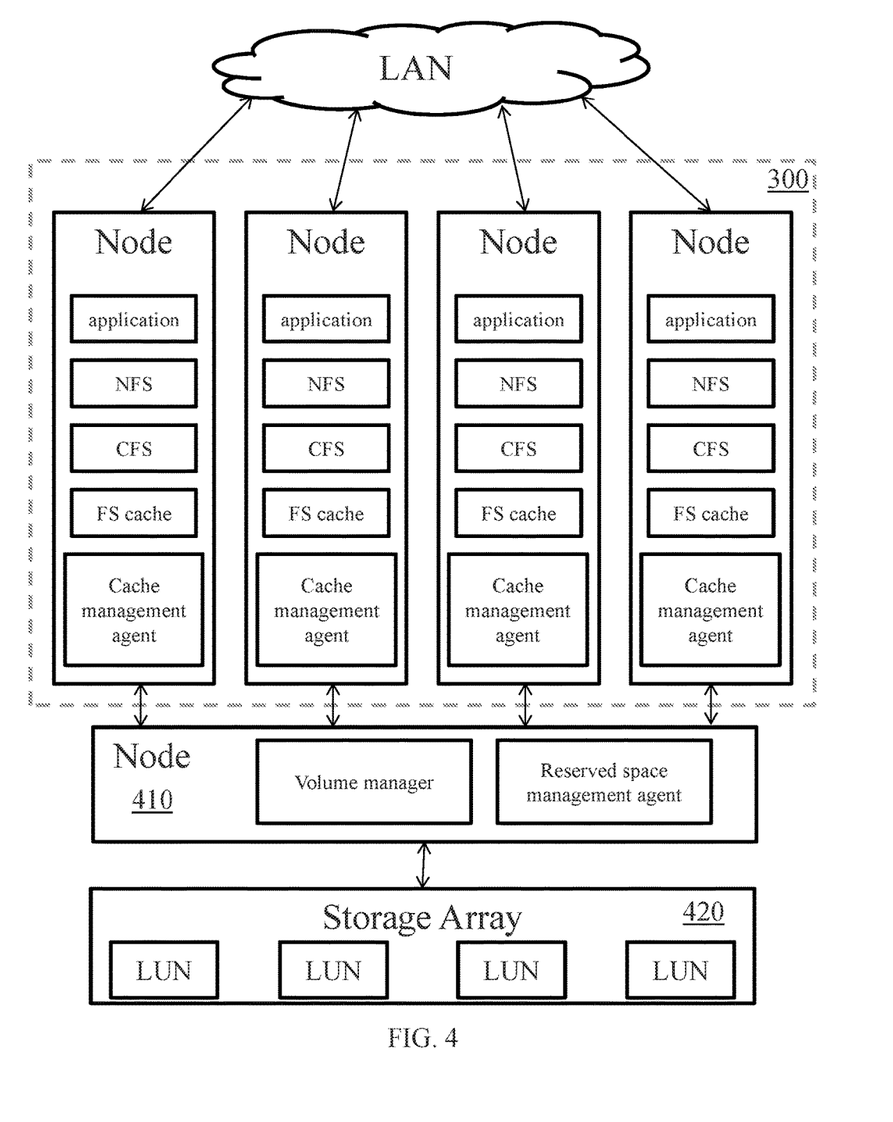
FIG. 4 shows a second exemplary implementation of a storage system in accordance with one embodiment of the present disclosure.

FIG. 4 shows a second exemplary implementation of a storage system in accordance with one embodiment of the present disclosure. As depicted in FIG. 4, the 4 nodes of the cluster 300 are coupled to a node 410 which hosts a volume manager and the reserved space management agent. However, in the FIG. 4 embodiment, the volume manager functions with a plurality of LUNs that are created by a storage array 420. The storage array 420 is used to provide LUNs which can be used to mount the plurality of network file systems and cluster file systems.

In one embodiment, the reserved space management agent includes functionality that is designed to receive a space reservation request via an API from a cache management agent in one of the file systems. The cache management agent monitors the file system cache while it accumulates a cache of allocating writes (i.e., first writes to the file systems, in contrast to non-allocating writes, which are writes to already allocated space in the file system). While the cache accumulates, required space is reserved in the file systems, and the cache and reserved space are managed in order to control the cached writes and/or the size of the reserved space. The cache is managed by the cache management agent, while the reserved space is managed by the reserved space management agent in response to API calls from the cache management agent.

Hence, embodiments of the present disclosure provide a number of advantages when it comes to provisioning thin storage systems, including the ability to manage caching allocating writes to be stored to physical storage in a thin provisioned environment while avoiding failures to commit the writes to disk due to failure to allocate storage by proactively reserving space. Embodiments of the present disclosure provide functionality that enables caching allocating writes without complications regarding whether the writes will successfully complete.

Figure 5:
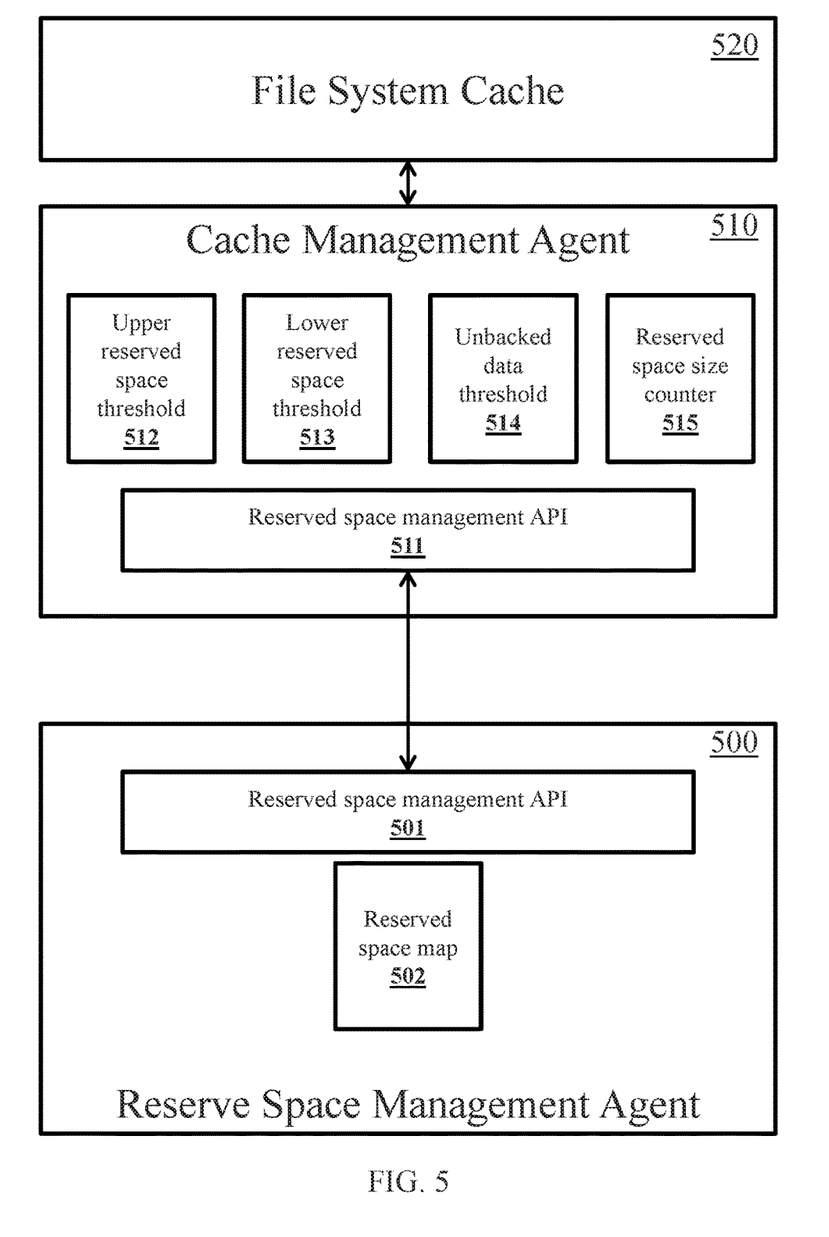
FIG. 5 shows a diagram of a reserved space management agent and cache management agent in accordance with one embodiment of the present disclosure.

FIG. 5 shows a diagram of a reserved space management agent 500 and cache management agent 510 in accordance with one embodiment of the present disclosure. As depicted in FIG. 5, the reserved space management agent 500 includes a reserved space API 501 and a reserved space map 502. Cache management agent 510 includes a reserved space API 511, an upper reserved space threshold 512, a lower reserved space threshold 513, an unbacked data threshold 514, and a reserved space size counter 515. The reserved space API 511 is interfaced with the reserved space API 501, and cache management agent 510 is interfaced with a file system cache 520.

The functionality of the agents 500 and 510 is directed towards ensuring that a thin provisioned storage system will not experience failures to write data to disk. This functionality is particularly advantageous when used in the context of thinly provisioned arrays. For example, a thinly provisioned array can fail to write a cached write request to physical storage if space has not yet been allocated to physical storage and the storage system runs out of physical storage to allocate while the allocating write request is cached. In a conventional situation, if this allocation failure affected a data write, data loss can occur. If this allocation failure affected a metadata write of the file system, a severe corruption problem can occur. In response to such a scenario, the file system would be designated for full-file system check (e.g., referred to as a "fsck"). Worse, the full file system check can take hours to execute and also could have a very real possibility of data loss. Embodiments of the present disclosure include functionality to ensure these events do not occur.

Figure 6:
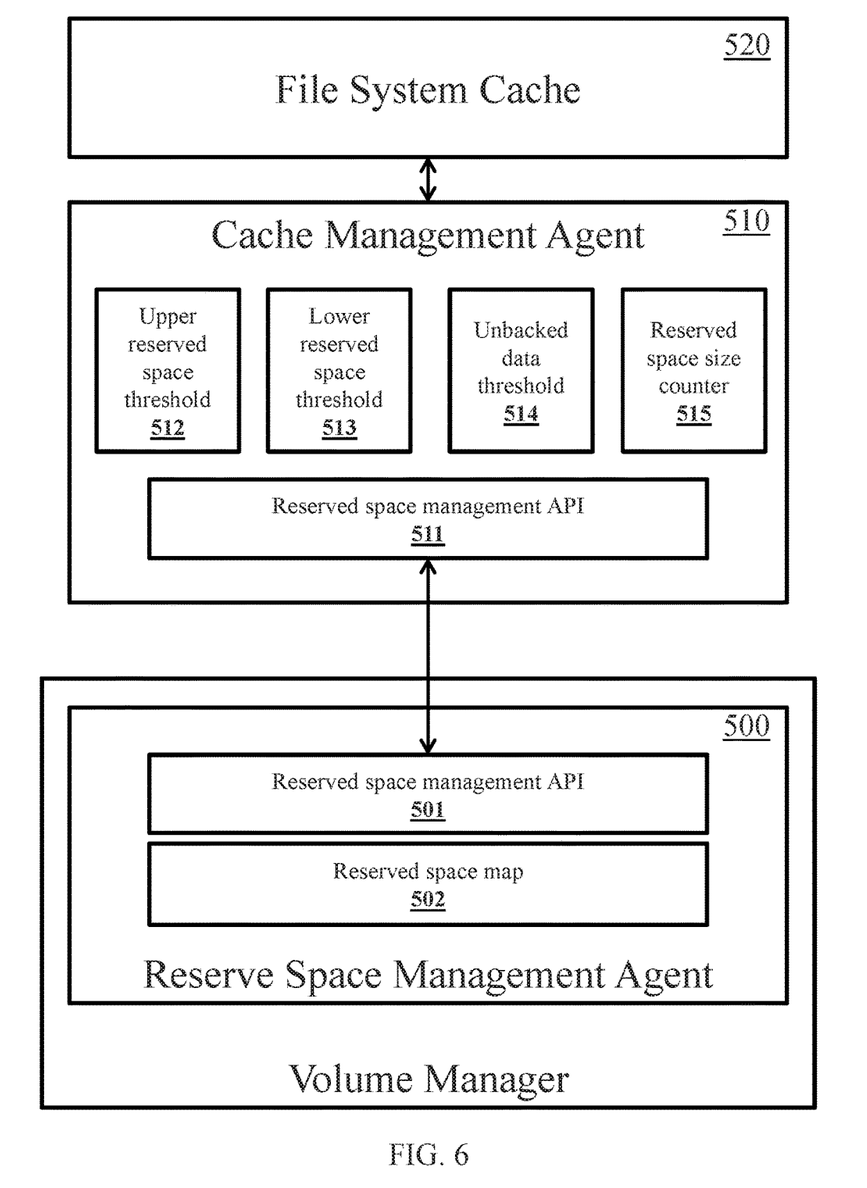
FIG. 6 shows a volume manager embodiment where the reserved space management agent is part of the code comprising the volume manager in accordance with one embodiment of the present disclosure.

FIG. 6 shows a volume manager embodiment where the reserved space management agent is part of the code comprising the volume manager in accordance with one embodiment of the present disclosure. FIG. 6 differs from FIG. 5 in that it shows the agent 500 instantiated within the same context as the volume manager. The volume manager functions by providing storage for mounted file systems.

In the FIG. 6 embodiment, in a typical operating scenario, a mounted file system writes new metadata to storage. The write requires a new allocation of storage and is thus an allocating write. The write request is placed into a file system cache and not immediately flushed to disk, and as a result, no space is allocated to the allocating write while it remains in the cache. As described above, if the file system is mounted on a thinly provisioned array, and this thinly provisioned array fails to allocate storage to any metadata writes, the file system would consider such an event as a fatal error. Such an event could typically cause the file system to initiate a full file system check, which disables the file system for any other or tasks while the file system check is proceeding. At this point, it's very likely that any cached file data by the file system would not make it to disk and there would be considerable loss of user data as well. Embodiments of the present disclosure ensure this does not occur using a reserved space management agent and a cache management agent.

The reserved space management agent provides an API which a node on which a file system is running may use to reserve space in the physical storage prior to allocating into the storage. In at least some embodiments, the API is called from a cache management agent. The cache management agent records the number, size, and/or cumulative total size of the allocating writes currently within the file system cache as well as the current amount of reserved space. In at least some embodiments, the cache management agent runs on the same node as the file system.

Figure 7:
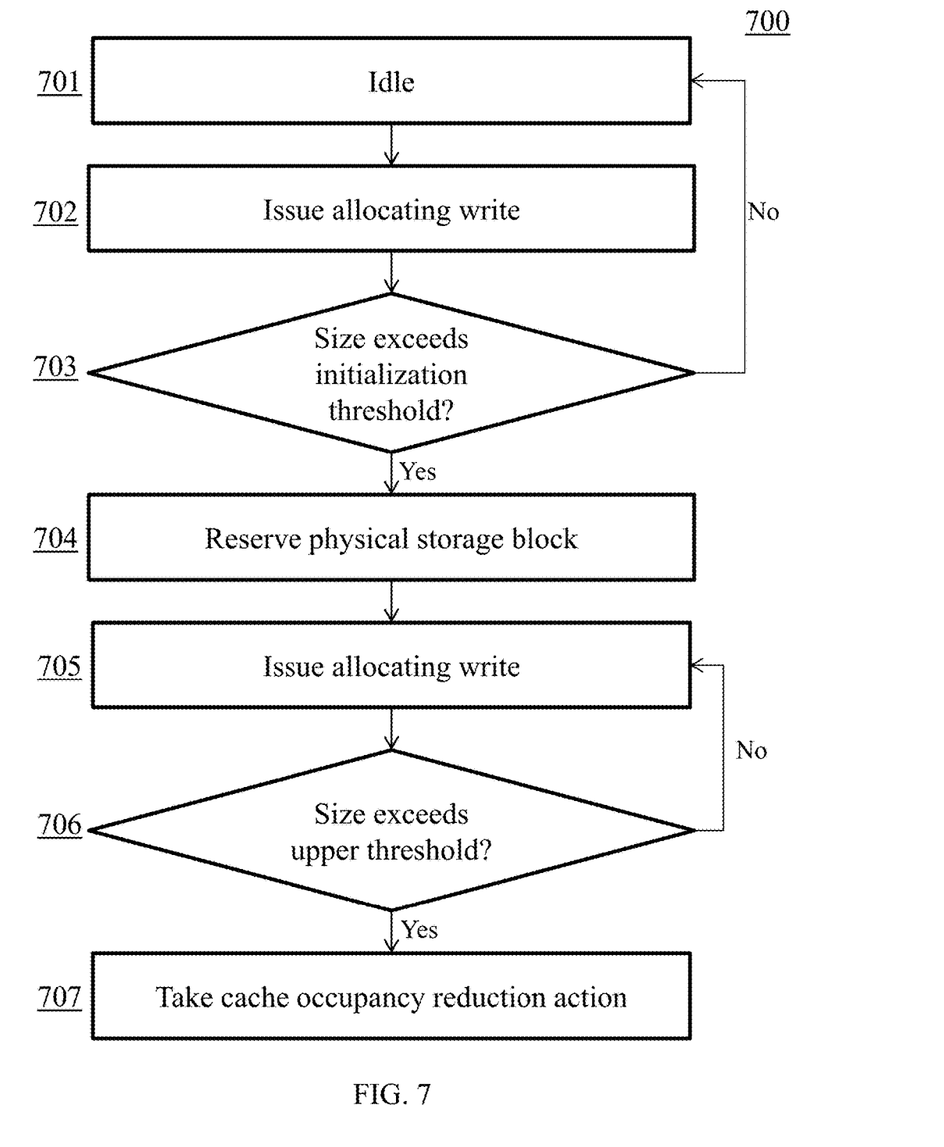
FIG. 7 shows a flowchart of the steps of a process for managing caching of allocating writes in a thinly provisioned file system in accordance with embodiments of the present disclosure.

FIG. 7 shows a flowchart of the steps of a process 700 for caching allocating writes in a thinly provisioned file system in accordance with one embodiment of the present disclosure.

In step 701, the file system is in an idle state, waiting for any new writes or reads.

In step 702, an allocating write to be stored to physical storage is issued. The allocating write is placed into the file system cache and the cache management agent updates the cumulative total size of the allocating writes currently cached within the file system cache.

In step 703, the cumulative total size of the allocating writes currently within the file system cache is compared to an initialization threshold. The initialization threshold may be zero in some embodiments, and it may be non-zero in other embodiments. If the threshold is exceeded, the process proceeds to step 705; otherwise, it returns to step 701 to wait for additional writes.

In step 704, an API call is made (e.g., by the cache management agent) to the reserved space management agent. The API call reserves a block (e.g., a block of 'S' megabytes of physical storage) in the physical storage array.

In step 705, additional allocating writes may be issued and cached. The allocating write is placed into the file system cache and the cache management agent updates the cumulative total size of the allocating writes currently cached within the file system cache. In some embodiments, step 706 occurs once immediately after step 704 (i.e., prior to step 705), as well as after step 705.

In step 706, the cache management agent determines if the total cumulative size of allocating writes within the file system cache has exceeded an upper threshold. This upper threshold may be a percentage of the reserved space (e.g., 75% of 'S') or the entirety of the reserved space (e.g., 100% of 'S'). Alternately, the upper threshold may be a fixed size unrelated to 'S' (e.g., 100 megabytes). If the upper threshold has been exceeded, the process proceeds to step 707; otherwise, the process waits for additional writes until the total cumulative size of allocating writes within the file system cache exceeds the upper threshold.

In step 707, the cache management agent triggers a cache occupancy reduction action. For example, the cache management agent may make an API call to reserve another block of physical storage or may trigger the node to begin to flush data to disk in the background. As an alternative or in addition to the cache occupancy reduction action, the file system cache may continue to accumulate data which lacks a backing store up to a dirty data threshold. The action may be triggered directly by the cache management agent, or it may be triggered by triggering a cache occupancy reduction agent to perform the cache occupancy reduction action. In embodiments in which the cache occupancy reduction action is performed by a cache occupancy reduction agent which is triggered by the cache management agent, the selection of what cache occupancy reduction action should be taken may be pre-configured, selected by the cache management agent and communicated to the cache occupancy reduction agent (e.g., by API), or may be selected by the cache occupancy reduction agent.

If an additional physical storage block is reserved, the process returns to step 706 and the file system cache may continue to accumulate allocating writes until an upper threshold is reached.

If the node is triggered to begin to flush data to disk in the background, allocating writes from the cache may be committed to physical storage in the background. In some embodiments, caching of allocating writes may be paused while this flush is ongoing. In some embodiments, the cached allocating writes are committed to physical storage within the reserved area, while other embodiments commit the cached allocating writes to physical storage outside the reserved area. The flush may continue until the total cumulative size of the allocating writes in the file system cache is reduced below a lower threshold. Once the total cumulative size is lower than the lower threshold, flushing of the cache may be paused and allocating writes may once more be cached, if they were paused while flushing was ongoing. In some embodiments, the lower threshold may be a percentage of the reserved space (e.g., 20% of 'S'). In other embodiments, the lower threshold may be 0% (i.e., a full flush of the cache to disk) or a fixed size unrelated to the reserved space (e.g., 32 megabytes).

While the embodiments in which background flushing occurs as a cache occupancy reduction action describe background flushing as occurring when the threshold is exceeded, both these embodiments and other embodiments may employ background cache flushing processes based on other criteria as well. For example, embodiments may flush cached allocating writes to physical storage when the cached allocating write has been cached for at least a predetermined amount of time.

In embodiments in which the file system cache continues to accumulate data which lacks a backing store up to an unbacked data threshold, the cache management agent compares the total cumulative size of the allocating writes in the file system cache, or the total cumulative size of the allocating writes in excess of the reserved space (i.e., the amount of cached data in allocating writes which does not have a reserved backing store), to the unbacked data threshold. This threshold may be user specified to allow the user to determine how much data may be uncommitted to physical storage without corresponding reserved space in the physical storage. The unbacked data threshold may be expressed as a percentage of the reserved space (e.g., 120% of 'S') or as a fixed size (e.g., 150 megabytes), and may be expressed directly (i.e., as a total amount of data) or relative to the amount of reserved space (i.e., as an amount of data cached for allocating writes in excess of the amount of reserved physical storage). When the unbacked data threshold is exceeded, caching of allocating writes may be paused and cache occupancy reduction actions (e.g., allocation of additional reserved space or flushing of cached writes to physical storage) may be triggered.

While described as distinct embodiments, the cache occupancy reduction actions described above may be combined into single embodiments. For example, background flushing of cached allocating writes without pausing caching of allocating writes may be combined with the ability to store a certain amount of data in excess of the amount of reserved space, at which point reservation of additional storage space may occur. In addition, the cache occupancy reduction actions may be performed by the cache management agent or may be commanded to be performed by the cache management agent and actually performed by other agents within the computer system (e.g., a cache flushing agent).

Figure 8:
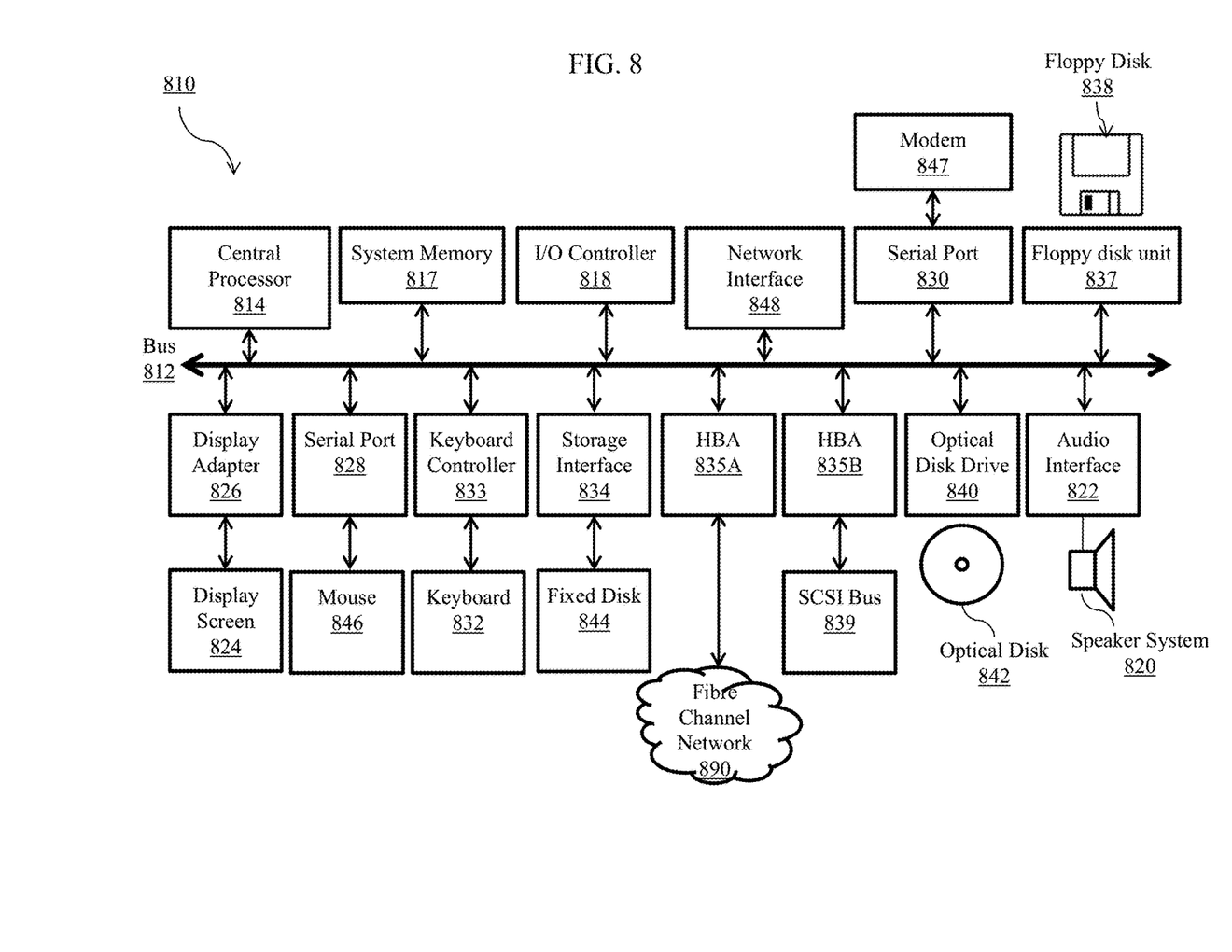
FIG. 8 depicts a block diagram of a computer system suitable for implementing certain functionality in accordance with one embodiment of the present disclosure.

FIG. 8 depicts a block diagram of a computer system 810 suitable for implementing certain functionality in accordance with one embodiment of the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a reserved space manager module 850 and/or a cache management module 851 which implement the reserved space and cache management functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
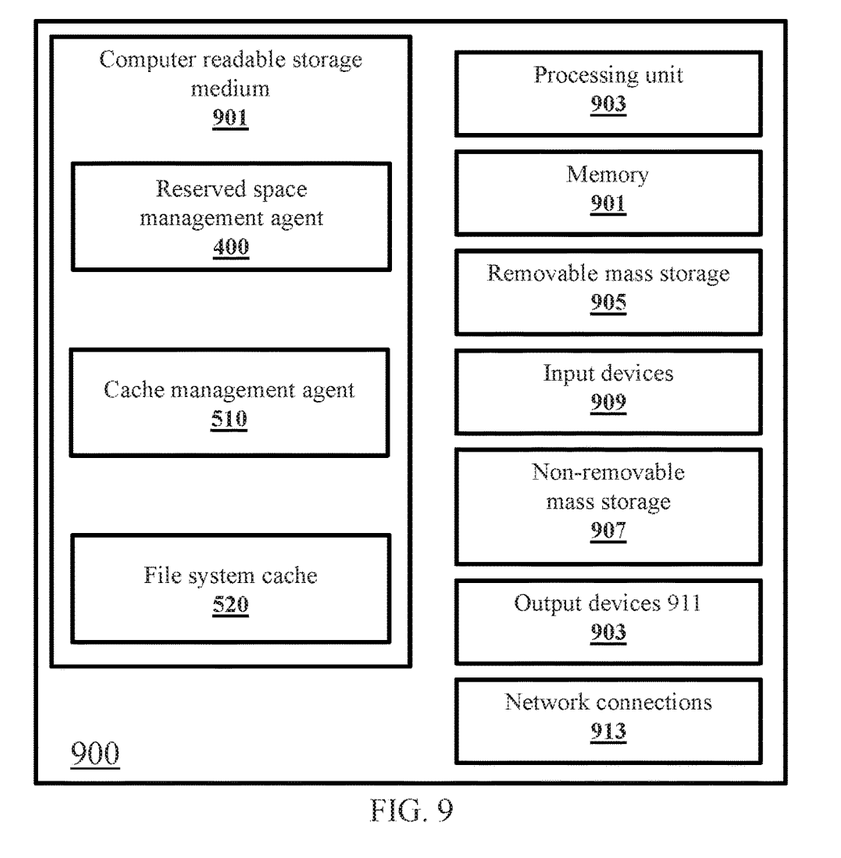
FIG. 9 shows an exemplary computer system according to one embodiment of the present disclosure.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., reserved space management agent 400 from FIG. 4, cache management agent 510 from FIG. 5, or file system cache 520 from FIG. 5) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901 *a*, non-volatile 901 *b* (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

The foregoing description, for the purpose of explanation, has been described with reference to specific embodiments. However, the illustrated discussions above are not intended to be exhaustive or to limit the present disclosure to the precise forms disclosed. Many modifications and variations are possible in view of the above teachings. Embodiments were chosen and described in order to best explain the principles of the present disclosure and its practical applications, to thereby enable others skilled in the art to best utilize the present disclosure and various embodiments with various modifications as may be suited to the particular use contemplated.

The invention claimed is:

1. A method comprising:
    caching allocating writes on a cache storage, wherein the cached allocating writes are writes not having a previously allocated physical storage space that are later to be stored on a physical storage separate from the cache storage that stores the cached allocating writes;
    in response to caching allocating writes, reserving a block of the physical storage separate from the cache storage that stores the cached allocating writes;

comparing a total cumulative size of the cached allocating writes to an upper threshold; and when the total cumulative size of the cached allocating writes exceeds the upper threshold, taking a cache occupancy reduction action;

wherein the reservation of the block of the physical storage, the caching allocating writes, and the cache reduction action are managed to avoid failures to commit to write to the physical storage.

2. The method of claim 1, wherein the cache occupancy reduction action is an action selected from the group of: performing background flushing to physical storage of the cached allocating writes and reserving additional physical storage.

3. The method of claim 1, further comprising: continuing to cache allocating writes;

comparing an unbacked data amount to an unbacked data threshold; and when the unbacked data amount exceeds the unbacked data threshold, taking one or more additional cache occupancy reduction actions.

4. The method of claim 3, wherein the unbacked data amount is the total size of the reserved physical storage subtracted from the total cumulative size of the cached allocating writes.

5. The method of claim 3, wherein caching allocating writes is paused when the unbacked data amount exceeds the unbacked data threshold.

6. The method of claim 3, wherein the unbacked data threshold is a percentage of the size of the reserved physical storage.

7. The method of claim 1, wherein reserving a block of physical storage comprises making an API call to a reserved space management agent.

8. The method of claim 1, wherein the upper threshold is a percentage of the size of the reserved physical storage.

9. The method of claim 1, further comprising pausing caching allocating writes until the cache occupancy reduction action is completed.

10. The method of claim 1, wherein the cache occupancy reduction action comprises performing background flushing to physical storage of the cached allocating writes and wherein the cached allocating writes are written to physical storage other than the reserved physical storage.

11. The method of claim 1, wherein the cache occupancy reduction action comprises performing background flushing to physical storage of the cached allocating writes and wherein taking the cache occupancy reduction action has started, further comprising:

comparing the total cumulative size of the cached allocating writes to a lower threshold; and stopping the background flushing to physical storage of the cached allocating writes if the total cumulative size of the cached allocating writes is smaller than the lower threshold.

12. A system comprising:
a program memory;
at least one processor communicatively coupled to the program memory and a storage device and configured to execute program instructions to cause the at least one processor to:
caching allocating writes on a cache storage, wherein the cached allocating writes are writes not having a previously allocated physical storage space that are later to be stored to physical storage in the storage device storage separate from the cache storage that stores the cached allocating writes;

in response to caching allocating writes, reserve a block of the physical storage separate from the cache storage that stores the cached allocating writes;

compare a total cumulative size of the cached allocating writes to an upper threshold; and when the total cumulative size of the cached allocating writes exceeds the upper threshold, take a cache occupancy reduction action;

wherein the reservation of the block of the physical storage, the caching allocating writes, and the cache reduction action are managed to avoid failures to commit to write to the physical storage.

13. The system of claim 12, wherein the cache occupancy reduction action is an action selected from the group of: performing background flushing to physical storage of the cached allocating writes and reserving additional physical storage.

14. The system of claim 12, wherein the program instructions further cause the processor to:

continue to cache allocating writes;

compare an unbacked data amount to an unbacked data threshold; and when the unbacked data amount exceeds the unbacked data threshold, take one or more additional cache occupancy reduction actions.

15. The system of claim 12, wherein the cache occupancy reduction action comprises performing background flushing to physical storage of the cached allocating writes, wherein, the program instructions further cause the processor to:

when the cache occupancy reduction action has started:
compare the total cumulative size of the cached allocating writes to a lower threshold; and
stop the background flushing to physical storage of the cached allocating writes if the total cumulative size of the cached allocating writes is smaller than the lower threshold.

16. The system of claim 12, wherein the allocating writes are cached in a cache memory coupled to the at least one processor.

17. The system of claim 12, further comprising a file system executed by the at least one processor and configured to issue allocating writes.

18. The system of claim 12, wherein the program instructions further cause the at least one processor to reserve the block of storage in the storage device by issuing a storage reservation API command to a reserve space management agent in the storage device.

19. The system of claim 12, wherein the program instructions further cause the at least one processor to execute a cache management agent, wherein the comparison is performed by the cache management agent.

20. The system of claim 19, wherein the program instructions further cause the at least one processor to take the cache occupancy reduction action by causing the cache management agent to trigger a cache occupancy reduction agent to perform the cache occupancy reduction action.

* * * * *